United States Patent [19]
Trefouel et al.

[11] Patent Number: 5,203,089
[45] Date of Patent: Apr. 20, 1993

[54] RAILROAD VEHICLE FOR MEASURING THE GEOMETRICAL PARAMETERS OF RAILROAD TRACK

[75] Inventors: Jean-Francois Trefouel, Gentilly; Marc Centil, Chateaubriand, both of France

[73] Assignees: Cegelec, Levallois-Perret; Ateliers Bretons de Realisations Ferroviaires, Chateaubriand, both of France

[21] Appl. No.: 712,273

[22] Filed: Jun. 10, 1991

[30] Foreign Application Priority Data

Jun. 12, 1990 [FR] France .................. 90 07276

[51] Int. Cl.⁵ ............... B61K 9/00; G01B 11/24
[52] U.S. Cl. ........................ 33/338; 33/287; 33/1 Q; 33/523.1; 33/651.1
[58] Field of Search ............. 33/338, 1 Q, 287, 523.1, 33/651, 651.1

[56] References Cited

U.S. PATENT DOCUMENTS

| 272,230 | 2/1883 | Fuller | 33/338 |
|---|---|---|---|
| 3,828,440 | 8/1974 | Plasser et al. | 33/287 |
| 3,864,039 | 2/1975 | Wilmarth | 33/287 |
| 4,040,738 | 8/1977 | Wagner | 33/287 |
| 4,173,073 | 11/1979 | Fukazawa et al. | 33/338 |
| 4,181,430 | 1/1980 | Shirota et al. | 33/287 |
| 4,490,038 | 12/1984 | Theurer et al. | 33/338 |
| 4,658,730 | 4/1987 | von Beckmann et al. | 33/287 |
| 4,691,565 | 9/1987 | Theurer | 33/287 |

FOREIGN PATENT DOCUMENTS

1916728 10/1969 Fed. Rep. of Germany .
597027 10/1977 Switzerland .

*Primary Examiner*—William A. Cuchlinski, Jr.
*Assistant Examiner*—C. W. Fulton
*Attorney, Agent, or Firm*—Sughrue, Mion, Zinn, Macpeak & Seas

[57] ABSTRACT

The invention relates to a railroad vehicle for measuring the parameters of a railroad track, characterized by the presence of third axles (13 and 23) with independent wheels and disposed between the main axles (11 and 12; 21 and 22) of the bogies (10 and 20) of the vehicle, and by the existence of a third bogie (30) having two axles (31 and 32) capable of undergoing relative angular displacement about a line passing through their centers, said third bogie (30) also having a third axle (39) with having independent wheels; the measurements are made by means of optical proximity meters and distance gauges.

6 Claims, 6 Drawing Sheets

RAILROAD VEHICLE FOR MEASURING THE GEOMETRICAL PARAMETERS OF RAILROAD TRACK

The present invention relates to a railroad vehicle for measuring the geometrical parameters of railroad track, and in particular the following parameters:

gauge of the rails of the track, i.e. the distance which separates the inside faces of the rails in a cross section of the track;

deflection or lining, i.e. the distance in a horizontal plane between a chord of a given length (e.g. 10 meters) and a point on the rail situated at a given distance from one of the ends of the chord (e.g. 4.5 meters from one end and 5.5 meters from the other end). This measurement is performed for each rail;

cant, i.e. the distance in a cross section between one of the rails and a horizontal based on the other rail;

warping, i.e. the vertical distance which separates the fourth corner from the rail when three corners of a rectangle of a given length rest on the rails. The length of the rectangle may, for example, be about that of a bogie: this is "short base" warping. The length of the rectangle may be about the distance between the two bogies of a vehicle; this is "long base" warping:

leveling or "boning", i.e. the difference in height between a chord of a given length, e.g. 10 meters, and a point on the rail at a given distance from the ends of the chord, e.g. 4.5 meters from one end of the chord and 5.5 meters from the other. This measurement is performed for each rail.

For trains to be safe, the geometrical parameters of the track must be within given tolerances, hence the necessity for continuously measuring each of the parameters.

Specifications impose continuous measurements to be made with a vehicle moving along the track at a speed of not less than 60 km/h, with this speed possibly reaching 160 km/h.

Such measurements are currently performed by means of a vehicle equipped with mechanical members making contact with the rails of the track. The accumulation of patches of grease on the track interferes with these measurements, such that it is preferable to perform these measurements without using mechanical members in contact with the track.

Proposals have been made to use optical means for measuring track parameters, in particular in the document U.S. Pat. No. 4,040,738.

The same principle is used in the present invention, but in a different and more complete way than in the above document.

The present invention provides a railroad vehicle for measuring by optical means the geometrical parameters of a track comprising a first rail and a second rail, the vehicle moving on said track and including a first bogie and a second bogie each of which has two main axles, said vehicle being characterized in that each of the first and second bogies includes a third axle with independent wheels, the vehicle also including:

a third bogie comprising two main axles, capable of moving relative to each other about an axis passing through their centers, and a third axle with independent wheels, placed between the two said axles;

three pairs of optical proximity meters disposed on respective ones of the three independent-wheel axles, each proximity meter including an emitter and a receiver placed so as to look at the inside faces of the first rail and the second rail respectively;

first and second pairs of optical distance gauges whose receivers are disposed head-to-tail in pairs at the ends of the central axle of the third bogie and whose emitters are disposed at the ends of the independent-wheel axles respectively of the first and second bogies; and a third pair of distance gauges whose receivers are placed at the ends of one of the main axles of the third bogie and whose emitters are disposed at the ends of the other axle of the third bogie.

In a first embodiment, the ray emitted by the proximity meter secured to an independent-wheel axle for measuring the gauge of the track is reflected towards the rail by a mirror secured to said axle.

In a variant, the ray emitted by the proximity meter secured to an independent-wheel axle for measuring the gauge of the track is reflected towards the rail by at least one mirror secured to the wheel of said axle.

Advantageously, the ray reflected on the mirror reaches the rail through a hole made in the flange of the wheel.

The invention is explained by the detailed description of an embodiment, with reference to the accompanying drawings in which.

Figure 1:
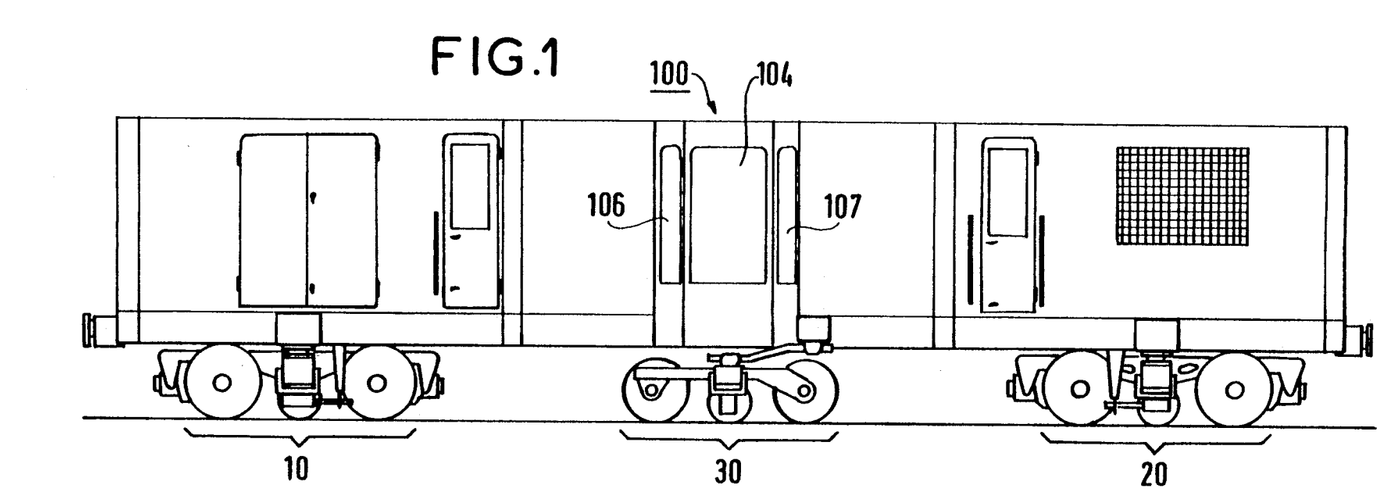
FIG. 1 is an elevation view of a vehicle of the invention.
Figure 2:
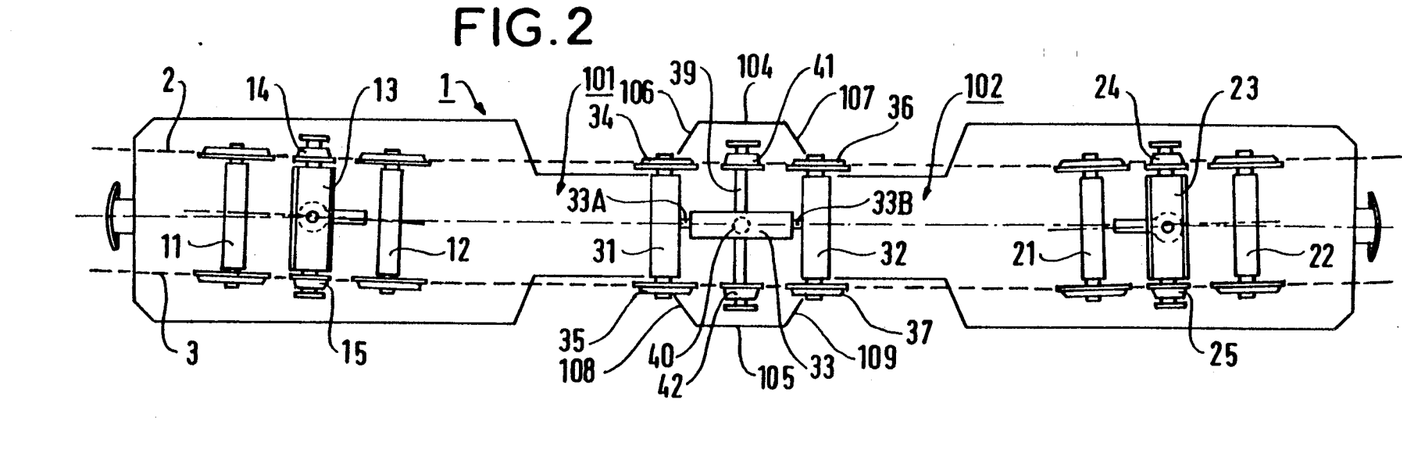
FIG. 2 is a view from below of the same vehicle.

In FIGS. 1 and 2, reference 1 designates a railroad vehicle of the invention, running on two rails 2 and 3 of a railroad track. The vehicle is provided with a first end bogie 10 and a second end bogie 20, each conventionally embodied by means of two one-piece axles with conical wheels referenced 11 and 12, and 21 and 22 respectively.

In accordance with the invention, the vehicle includes a third bogie 30, disposed between the bogies 10 and 20, and having special features which are described below.

In accordance with a characteristic of the invention, each of the bogies 10 and 20 has a third axle, referenced respectively 13 and 23 and provided with independent wheels 14 and 15 and 24 and 25 that are preferably smaller in diameter than the other wheels of the bogies. These additional axles, placed between the main axles, are preferably retractable so that they leave the track when the vehicle is not performing measurements.

The third bogie 30 includes two axles 31 and 32 capable of pivoting about a line passing through their respective centers; they are linked to a common crossbeam by suitable joints 33A and 33B. The wheels of axle 31 are referenced 34 and 35, and the wheels of axle 32 are referenced 36 and 37.

The bogie 30 has a third axle 39, disposed between the axles 31 and 32 and linked at 40 to the crossbeam 33; the axle 39 is provided with two independent wheels 41 and 42. The axle 39 is preferably retractable.

The terms "independent-wheel" axle and "additional" axle are used below interchangeably to designate the axles 13, 23, and 39.

MEASURING RAIL GAUGE

This measurement can be made by equipping only one of the independent-wheel axles in the manner described below. In practice, all three additional axles 13, 23 and 39 are equipped so that lining can also be measured, as shown below.

Figure 3:
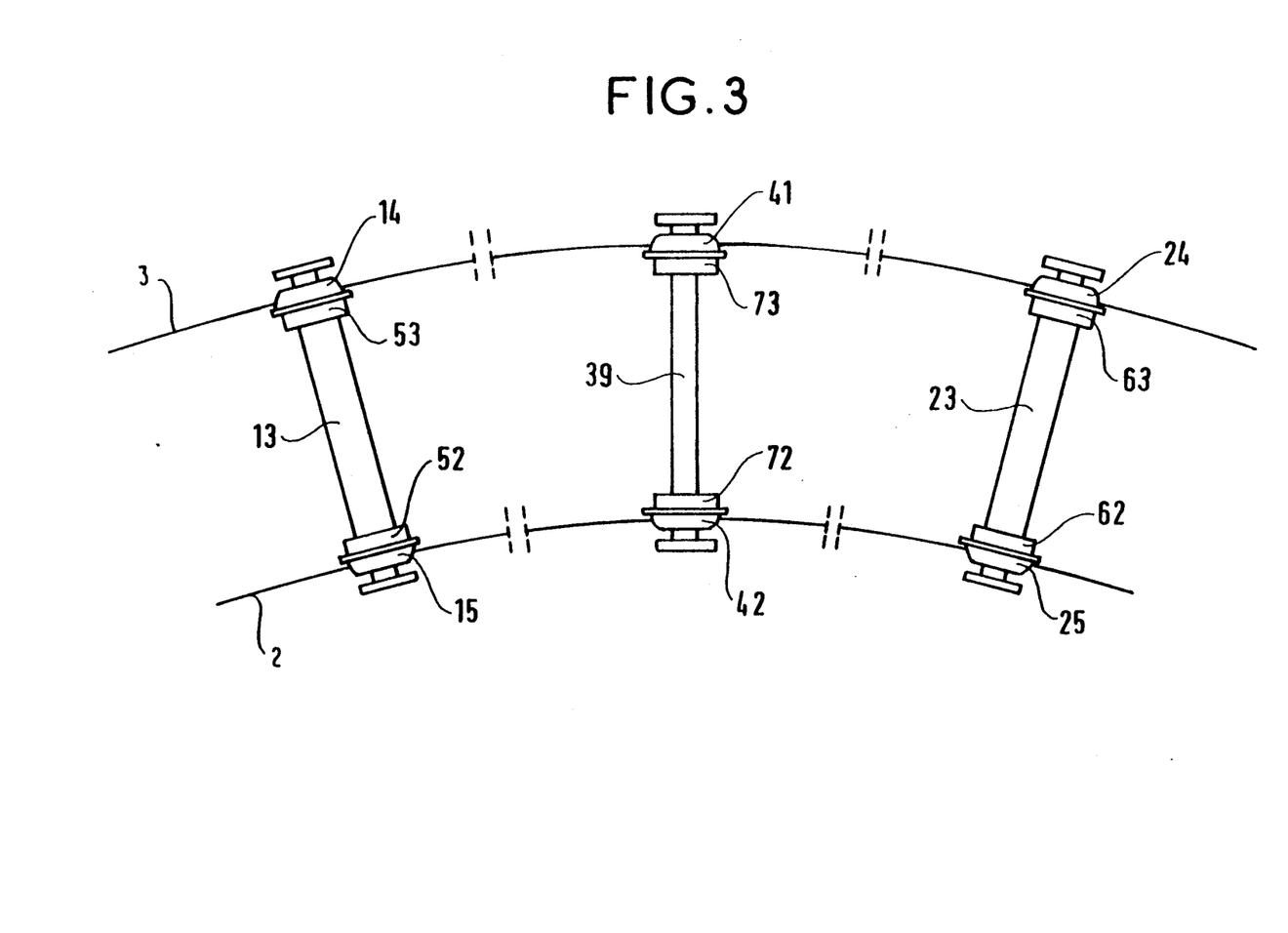
FIG. 3 is a diagram illustrating the measurement of track gauge.

Reference is made to FIG. 3 in which only the rails 2 and 3 and the additional axles 13, 23 and 39 are shown. Each axle is provided with a pair of proximity meters; the term "proximity meter" designates an optical device comprising a light-emitting source (also called an emitter) and a receiving member which includes receiver diodes, for example. The emitted ray is directed onto an object and reflects off it; the apparatus provides a measurement of the distance separating the object from the apparatus. Such proximity meters are commercially available for example from Reom, under the trademark Capitolas.

The figure shows that the additional axle 13 is provided with a proximity meter 52, disposed at the same end of the axle as the rail 2, and with there being a proximity meter 53 disposed at the same end of the axle as the rail 3. The beam from proximity meter 52 is directed onto the inside face of rail 2 and reflects off it; likewise, the beam from proximity meter 53 is directed onto the inside face of rail 3. If the distance separating the proximity meter 52 from the rail 2 and measured by the proximity meter 52 is designated e, the distance separating the proximity meter 53 from the rail 3 and measured by the proximity meter 53 is designated e', and the distance separating the proximity meters 52 and 53 is designated a, then the width of the track is equal to: a+e+e'.

The proximity meters with which the additional axle 23 is equipped are referenced 62 and 63, and the proximity meters with which the additional axle 39 is equipped are referenced 72 and 73.

Figure 4:
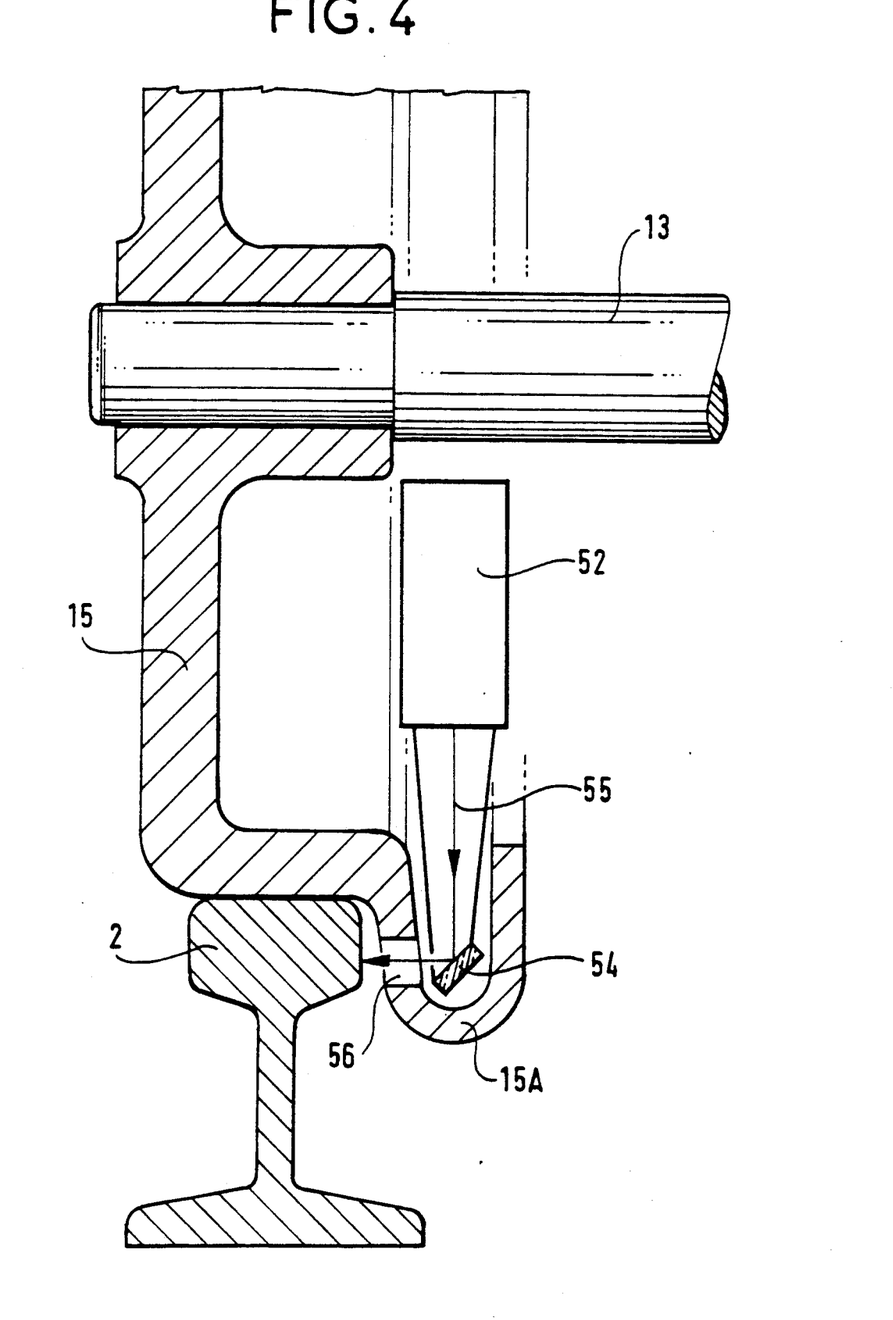
FIG. 4 is a diagrammatic view illustrating how a proximity meter is used to measure gauge, in a first embodiment.

FIG. 4 illustrates a first embodiment in which the proximity meter 52 secured to the crossbeam of axle 13 is also secured to a mirror 54; this mirror reflects the light beam 55 emitted by the proximity meter towards the rail 2; the ray reaches the inside face of the rail 2 after passing through a hole 56 made in the flange 15A of the wheel 15. The reflected beam follows the same path in the opposite direction. One measurement can thus be made per rotation of the wheel. If a plurality of equidistant holes are disposed around the periphery of the wheel rim, a plurality of measurements can be made per rotation of the wheel. Since the mirror is disposed inside the flange it can be protected against pollution such as mud, moisture, and dust, and against mechanical shocks.

Figure 5:
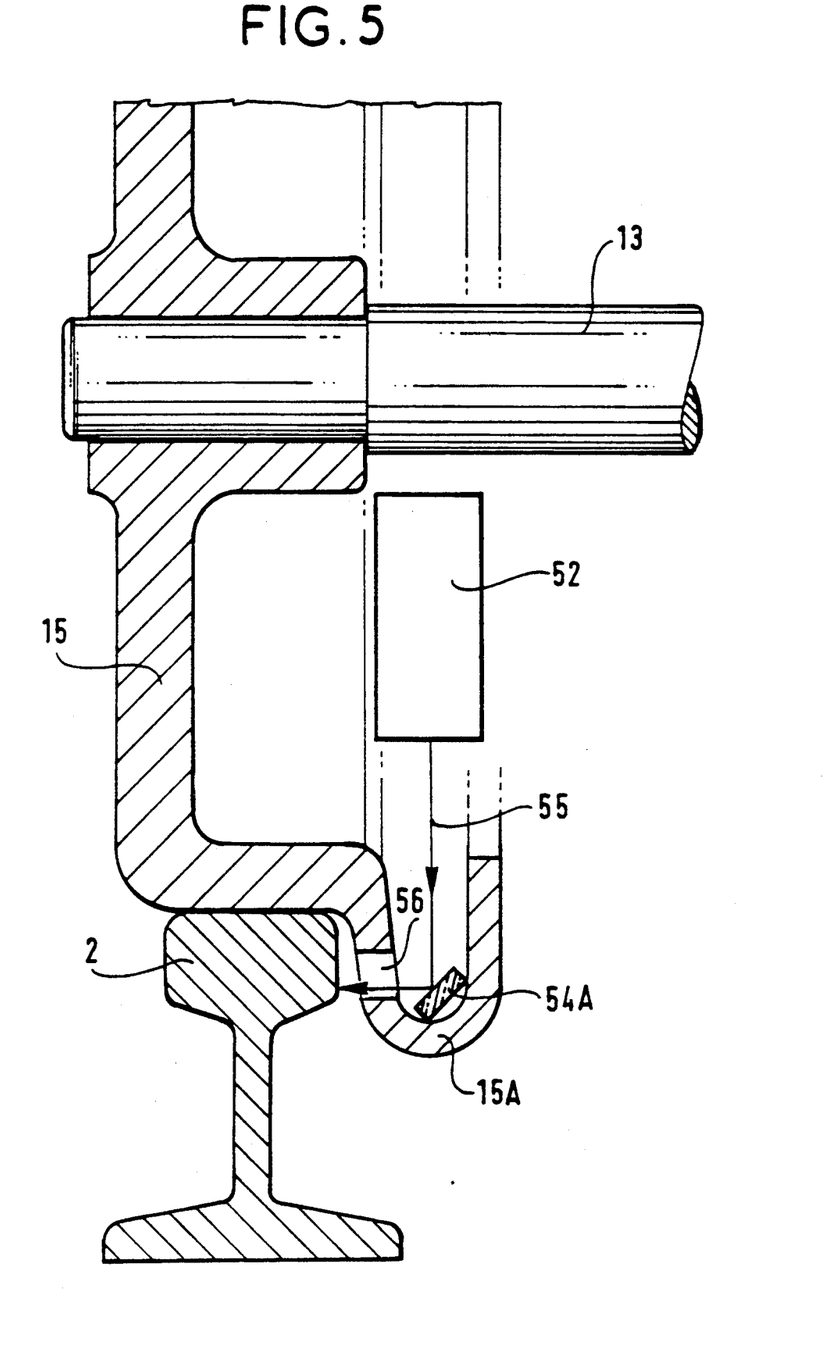
FIG. 5 is a diagrammatic view illustrating how a proximity meter is used to measure gauge, in a second embodiment.

In the variant embodiment shown in FIG. 5, the proximity meter 52 secured to the crossbeam of axle 13 is linked to at least one mirror 54A which is secured to the wheel 15; the beam 55 reaches the inside face of rail 2 after passing through a hole 56 made in the flange 15A of the wheel 15; the reflected ray follows the same path in the opposite direction. With one mirror, one measurement can be made per rotation of the wheel; it is possible to dispose a plurality of mirrors and an equal number of holes in order to obtain a plurality of measurements per rotation of the wheel.

MEASURING LEVELING AND LINING

For this purpose distance gauges are used. A distance gauge is an optical device comprising a light-emitting source and a receiver consisting in particular of a matrix of receiver diodes. Such an apparatus provides the distance between the relative horizontal and vertical positions of the receiver and the emitter from a reference point. Such a distance gauge is commercially available for example from Micromaine under the trademark Sirrah.

Figure 6:
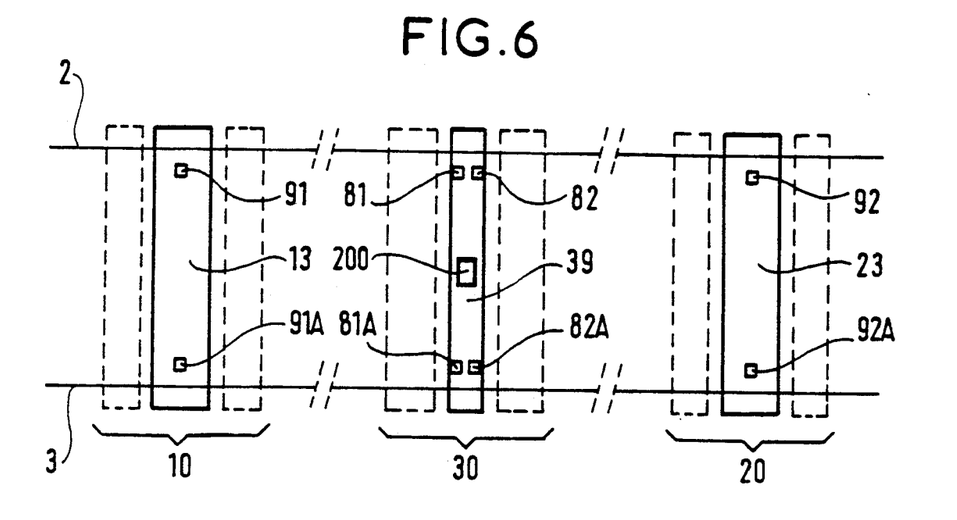
FIG. 6 is a diagram of the device of the invention for measuring leveling and lining.

As is shown in FIG. 6, the receivers of the distance gauges are placed on the additional axle 39 of the bogie 30 and the emitters of the distance gauges are placed on the additional axles 13 and 23 of bogies 10 and 20. More precisely, for measuring the parameters of rail 2, a pair of distance gauges are used, their component parts being situated at the ends of the axles next the rail in question. Only the apparatus relative to measuring the parameters of rail 2 are described below, the apparatus for measuring the parameters of rail 3, referenced in FIG. 6 with the index A, being identical and situated at the other ends of the axles.

For measuring the leveling and the lining of rail 2, two distance gauges are used, their receivers 81 and 82 being placed head-to-tail at the end of the crossbeam 39 next to the rail 2; these receive the beams emitted by the emitters 91 and 92, placed on the crossbeams 13 and 23 respectively, at those ends of the crossbeams that are next to the rail 2. These components are adjusted such that the horizontal and vertical distances measured on a perfectly horizontal and rectilinear track have a reference value.

After computer processing, the horizontal and vertical distances measured by the receivers 81 and 82, together with the measurements made by the proximity meters 52, 72 and 62 (FIG. 3), provide a measurement of the leveling and lining of the rail 2.

By placing two identical systems head-to-tail, and taking the difference between the measurements obtained, errors in measurement due to twisting of the vehicle body can be eliminated.

MEASURING WARPING

Figure 7:
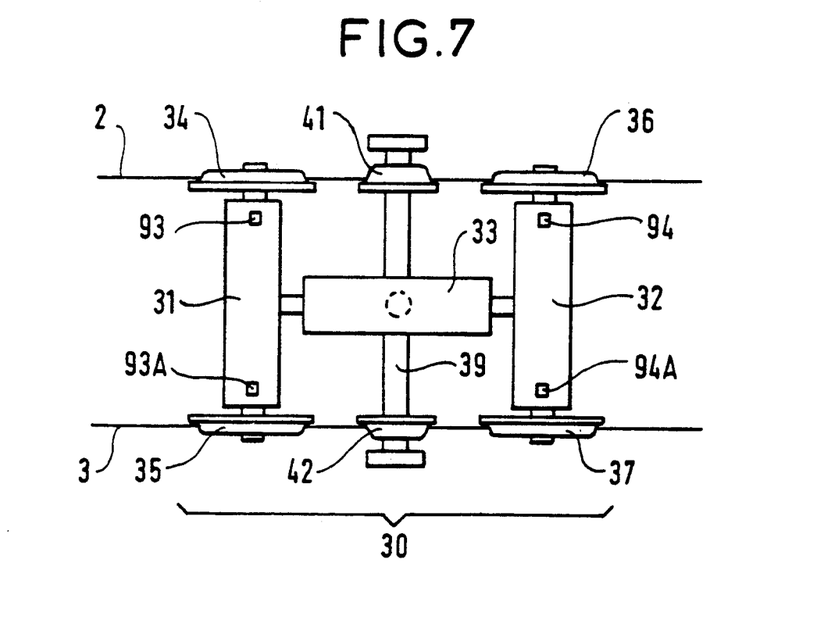
FIG. 7 is a diagram of the device of the invention for measuring warping.

The same measuring theory as described above is used in disposing pairs of distance gauges on the central bogie 30.

In FIG. 7, the receivers 93 and 93A of two distance gauges are situated at the ends of the crossbeam of axle 31; the associated emitters 94 and 94A are placed at the ends of axle 36.

The adjustment is such that perfectly plane and rectilinear track has a deflection of zero.

After being computer processed, the horizontal and vertical distances measured by the receivers 93 and 93A provide a measurement of track warping.

MEASURING CANT

Figure 8:
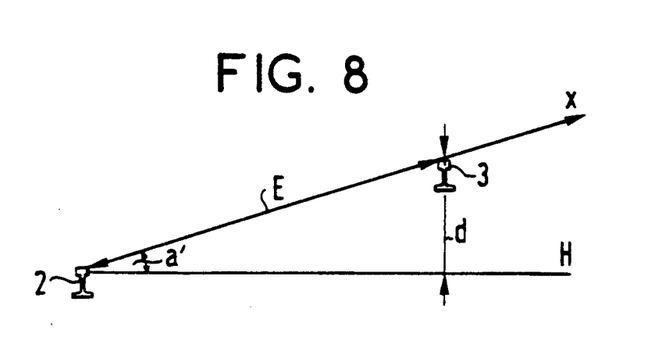
FIG. 8 is a diagram showing how a cant parameter is defined.

If the gauge of the rails is designated E, and the angle formed, in a cross section of the track, between a horizontal line H and the line joining the two rails of the track is designated a', the value d of the cant is given by the equation:

$$d = E \cdot \sin a' \quad \text{(FIG. 8)}$$

The value of a' is obtained by means of a tilt indicator on board the vehicle and preferably disposed on the third bogie. This tilt indicator is represented in FIG. 6 by a rectangle 200.

A tilt indicator detects an angle relative to gravity: a pendulum weight is supported by a moving frame suspended from a flexible blade. If the apparatus is on a horizontal plane, the pendulum weight support is vertical; if the apparatus is sloping, the pendulum weight tends to move under the force of gravity. This movement is detected by an electrical proximity sensor and a servo-control circuit transforms this movement into a proportional current which is applied to the moving frame in order to return the pendulum weight to its position. A signal kv, proportional to the voltage across the terminals of the frame, provides the measurement of the angle a'. Such tilt indicators are well known, for example as commercially available from Schaevitz.

When the vehicle is moving, the pendulum weight of the tilt indicator is subjected not only to the acceleration g due to gravity, but also to a centrifugal acceleration proportional to $V^2/R$, where V designates the speed of the vehicle and R designates the radius of the curvature of the track.

The speed V of the vehicle is measured by conventional means. The radius of curvature R is determined in the manner shown below.

Figure 9:
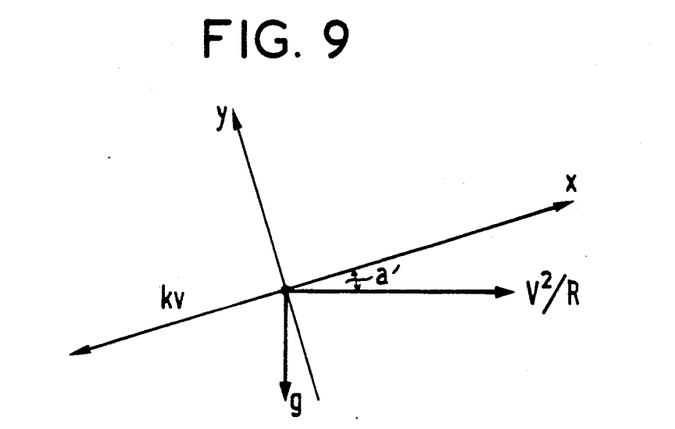
FIG. 9 is a diagram of the accelerations on the pendulum weight of a tilt indicator which is used to measure the cant parameter.

FIG. 9 is a diagram of the acceleration to which the pendulum weight of the tilt indicator is subjected.

The resultant of the accelerations is:

$$(V^2/R) \cos a' - g \sin a' = kv$$

The solutions to this equation, delivered by calculator means, are given by the equation:

$$\sin a' = (-B \pm \sqrt{(A^2 - B^2 + 1)})/(1 + A^2)$$

where $A = V^2/Rg$ and $B = kv/g$

Which root to use is chosen as a function of the algebraic value of the lining of the track, which is calculated elsewhere (see above).

The radius of the curvature is measured by calculation, by means of the apparatus which allows the parameter of track lining to be measured. The measurement is made simultaneously on both rails of the track and the mean of the two measurements is taken.

Figure 10:
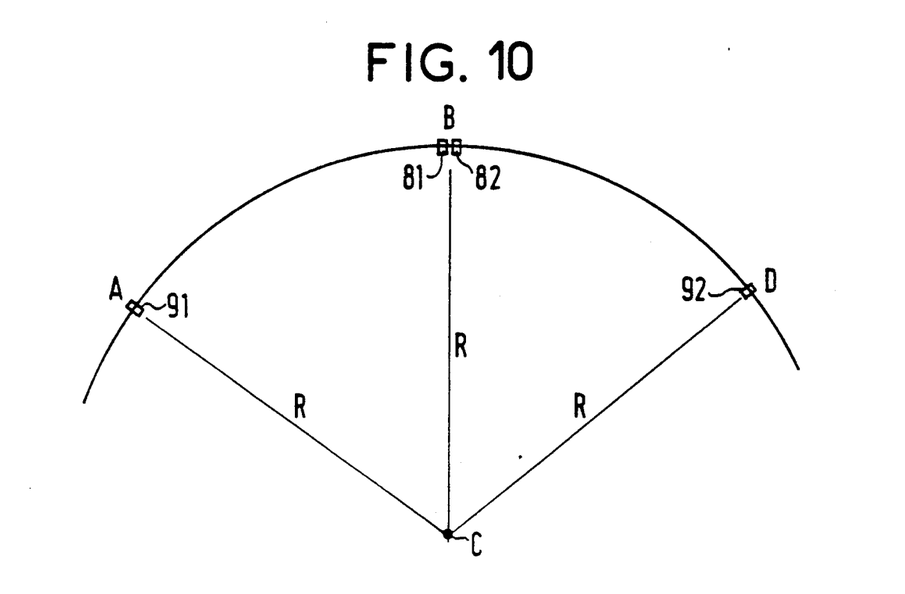
FIG. 10 is a diagram explaining how the radius of curvature of the track is measured.

FIG. 10 illustrates the theory of this measurement, but for the sake of clarity only one of the two rails is shown.

The distance gauges 81 and 91 and 82 and 92, already mentioned with reference to FIG. 6, are used.

If the coordinates of the emitter 91 are designated by xA,yA and the coordinates of the emitter 92 are designated by xD,yD with the coordinate origin B being situated at the site of the receivers 81 and 82 placed head-to-tail, the radius of the curvature R is given by the solution of the system:

$$(xA - xC)^2 + (yA - yC)^2 = R^2$$

$$(xD - xC)^2 + (yD - yC)^2 = R^2$$

$$xC^2 + yC^2 = R^2$$

where xC and yC designate the coordinates of the center C of the circle passing through the points A, B and D.

By measuring cant with a tilt indicator, which is very precise and very shock resistant, it is possible to achieve the degree of precision required by railroad operators.

The invention, which is based on the use of a additional bogie and additional axles having independent wheels, and also on measuring members placed directly on the axles, allows measurement results to be obtained without interference from any movement or deformation of the body of the vehicle.

It will be noted that, according to a characteristic of the invention, the body of vehicle 1 of the vehicle, FIG. 2, presents a central portion 100, delimited by two narrower portions 101 and 102; the portion 100 has side windows 104 and 105 and oblique windows 106 and 107 and 108 and 109; the operator rides in the central portion and can thus observe signs outside the track (e.g. milestones).

The vehicle is symmetrical, which allows it to be used in both travel directions.

We claim:

1. In a railroad vehicle for measuring by optical means the geometrical parameters of a track comprising a first rail and a second rail, the vehicle moving on said track and including a first bogie (10) and a second bogie (20) each of said bogies having two main axles, the improvement wherein each of the first and second bogies includes a third axle (13, 23) with independent wheels, and said vehicle further includes:

a third bogie (30) mounted to the vehicle between said first and second bogies and comprising two main axles (31 and 36), capable of moving relative to each other about an axis passing through their centers, and a third, central axle (39) with independent wheels, placed between said two main axles of said third bogie;

three pairs (51 and 53; 62 and 63; 72 and 73) of optical proximity meters disposed on respective ones of the three independent-wheel axles (13, 23 and 29), each proximity meter including an emitter and a receiver placed so as to look at the inside faces of the first rail (2) and the second rail (3) respectively;

first and second pairs of optical distance gauges whose receivers (81 and 82; 81A and 82A) are disposed head-to-tail in pairs at the ends of the central axle (39) of the third bogie (30) and whose emitters (91 and 92; 91A and 92A) are disposed at the ends of the independent-wheel axles (13 and 23) respectively of the first (10) and second (20) bogies; and a third pair of distance gauges whose receivers (93 and 93A) are placed at the ends of one (31) of the main axles of the third bogie (30) and whose emitters (94 and 94A) are disposed at the ends of the other (36) axle of the third bogie (30).

2. A vehicle according to claim 1, wherein a ray is emitted by said proximity meter (52) secured to an independent-wheel axle (13) for measuring the gauge of the track and is reflected towards the rail by a mirror (54) secured to said axle.

3. A vehicle according to claim 1, wherein a ray is emitted by said proximity meter (52) secured to an independent-wheel axle (13) for measuring the gauge of the track and is reflected towards the rail by at least one mirror (54A) secured to the wheel (14) of said axle.

4. A vehicle according to claim 2 or 3, wherein said ray reflected on the mirror reaches the rail through a hole (56) in a flange (15A) of the wheel (15).

5. A vehicle according to claim 1, further including a tilt indicator (200) providing a measurement of an angle formed in a cross section of the track between a horizontal line and a line joining the two rails, and said measurement being used to calculate the cant parameter of the track.

6. A vehicle according to claim 1, further including a vehicle body having a central portion (100) bordered by two narrower portions (101 and 102), said portions being provided with windows (104, 105, 106, 107, 108 and 109) for observing markers outside the track.

* * * * *